Patented Feb. 12, 1929.

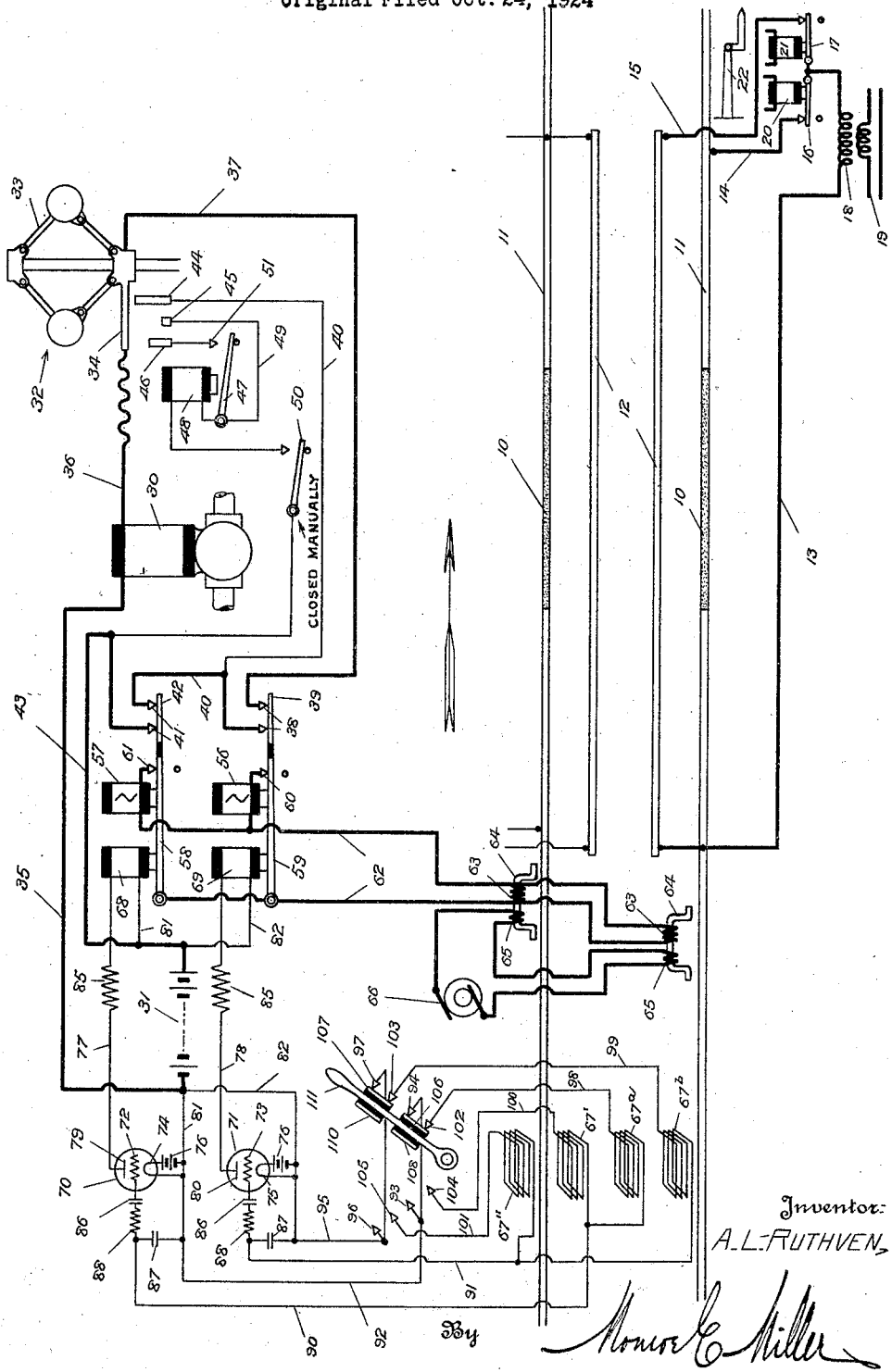

1,701,544

UNITED STATES PATENT OFFICE.

ALFRED L. RUTHVEN, OF ROCHESTER, NEW YORK, ASSIGNOR TO UNION SIMPLEX TRAIN CONTROL CO., INC., OF ROCHESTER, NEW YORK, A CORPORATION OF DELAWARE.

SIMPLEX CONTINUOUS-INDUCTION INTERMITTENT TRAIN CONTROL.

Application filed October 24, 1924, Serial No. 745,642. Renewed January 29, 1927.

The present invention relates to automatic train control, and aims to provide a novel and improved apparatus of that kind which is comparatively simple in construction and moderate in cost, in addition to being practical and efficient in operation, this invention being an improvement over the apparatus disclosed in my copending application Serial No. 735,159, filed Aug. 30, 1924.

Another object of the invention is the provision of automatic train control apparatus utilizing continuous induction between the train or vehicle and the track to keep the train running, with intermittent control between the track or roadway and the train or vehicle at control stations or locations, in order that the train or vehicle equipment can be set for different conditions, such as clear, caution and danger, when passing the control stations, depending on traffic conditions or wayside signals.

A further object is the use of a non-magnetic track section at each control station of the track, with rail responsive inductive means on the train or vehicle to maintain running conditions (either clear or caution) when travelling between or beyond control stations and for interrupting such control and obtaining danger or emergency conditions when passing a control station, in combination with traffic controlled means at the control stations for supplying electrical energy, and means on the train or vehicle for picking up the energy at control stations so as to obtain running conditions, such as clear or caution, if the required energy is received from the track means, so that failures will be on the side of safety. Thus, the non-magnetic track section at each control station will assure of a break in the inductive relation between the vehicle equipment and the track whenever passing a control station, to result in a danger or emergency condition, unless the required energy is received by the vehicle equipment from the track means, when passing the control station, to obtain either caution or clear conditions, and failure of electrical current or energy, short circuits, grounds, and the like, resulting in the stopping or retarding of the train or vehicle.

A further object is to reduce to the most simple construction the cooperable elements between the track and the vehicle, thereby not only reducing the cost of installation, but also eliminating ramps, trips, and similar contact devices or obstructions on the track, as well as providing for efficient and dependable cooperation between the track and vehicle elements. The responsive elements of the vehicle equipment may be in fixed relation to the vehicle, without movable parts with reference to the vehicle, other than relays or other translating means controlled by said elements, and the track elements are the traffic rails themselves, and control rails or conductors on the track at control stations, whereby the track devices are extremely simple and will not constitute objectionable obstructions on the road-way.

With the foregoing and other objects in view, which will be apparent as the description proceeds, the invention resides in the construction and arrangement of parts, as hereinafter described and claimed, it being noted that changes can be made within the scope of what is claimed, without departing from the spirit of the invention.

The invention is illustrated in the accompanying drawing, wherein the figure is a diagrammatical view of the improved apparatus.

Track equipment.

In carrying out the invention, a manganese or other non-magnetic rail section 10 is disposed in each rail 11 of the track at each control station or location, in order to obtain inductive interruption between the vehicle and track whenever passing a control station, and said rail sections are preferably opposed and are of the usual rail section length (33 feet), although two or more of such rail sections can be used in each rail when a longer interval of inductive interruption is desired.

Control rails or electrical conductors 12 are mounted on the track at each control station, preferably between the rails 11, and are longer than the rail sections 10 to project for a distance beyond the opposite ends of the rail sections 10. The two rails or conductors 12 are used for two-way traffic on a single track, and one of said rails or conductors can be eliminated for movements in one direction only on the track, as will be apparent when the invention is better understood.

In the following description, excepting as stated otherwise, reference will be made to the rail 11 and rail or conductor 12 toward the bottom of the drawing, which are used for control of the vehicle when travelling toward the right, as indicated by the arrow.

Electrical current is passed along the rail 11 and rail or conductor 12 at the control station for supplying energy to be picked up by the vehicle equipment for obtaining running conditions, either caution or clear. For this purpose, a conductor 13 is electrically connected with one end of the conductor 12 and with the rail 11 adjacent to said end of the conductor 12, and conductors 14 and 15 are connected to the rail 11 and conductor 12 at the opposite end of said conductor 12, said electrical connections being made with the rail 11 and conductor 12 at suitable distances beyond the opposite ends of the non-magnetic rail sections 10. Switches 16 and 17 are provided to connect the conductor 13 with the respective conductors 14 and 15, thereby completing two separate track circuits. Both circuits receive electrical energy of suitable frequency and E. M. F. by way of a transformer 18 between the conductor 13 and a supply line 19 in which alternating or pulsating current flows. The switches 16 and 17 may be operated manually or automatically, but are preferably controlled by the wayside signal apparatus, so that the control of the vehicle equipment is entirely automatic according to traffic conditions or wayside signals. Thus, as shown, electro-magnets 20 and 21 of the wayside signal apparatus close the switches 16 and 17 when said magnets are energized. Said magnets are both energized when the semaphore 22 is in clear position, the magnet 20 is deenergized and the magnet 21 energized when the semaphore 22 is in caution position, and both magnets are deenergized when the semaphore is in danger position. Accordingly, under clear traffic conditions in the block in advance, with both both switches 16 and 17 closed, electrical current will flow in the rail 11 and conductor 12 which are included in the track circuits, so that the vehicle elements can pick up energy from both the rail 11 and conductor 12. Under caution conditions, with the switch 16 open, only the conductor 12 receives electrical energy, and under danger conditions neither the rail 11 or conductor 12 are supplied with electrical energy.

*Vehicle equipment.*

The vehicle equipment includes an electro-magnet 30 controlling an air valve or other device for applying the brakes or otherwise retarding the movement of the vehicle when the magnet is deenergized, a battery or other source of electrical energy 31 to energize said magnet 30 and other magnets of the vehicle equipment, and a speed control switch 32 including the centrifugal governor 33 carrying a movable switch member or brush 34. The normal running or clear circuit of the vehicle equipment includes the battery 31, conductor 35, magnet 30, conductor 36, brush 34, conductor 37, contacts 38 and switch 39, conductor 40, contacts 41 and switch 42, and conductor 43. Both switches 39 and 42 must therefor be closed for clear conditions.

When the switch 39 is open, and the switch 42 closed, a caution circuit is established which includes the speed control switch 32. Such circuit comprises the battery 31, conductor 35, magnet 30, conductor 36, brush 34, a contact strip 44, conductor 40, contacts 41 and switch 42, and conductor 43. The strip 44 is arranged to be engaged by the brush 34 when the vehicle is travelling below a predetermined maximum caution speed, of say from twenty to thirty miles per hour, the governor 33 being connected to a wheel, axle or other part of the vehicle so that the brush 34 is moved in accordance with the vehicle speed. Therefore, when travelling below the maximum caution speed, with the brush 34 engaging the contact strip 44, the caution circuit is closed to keep the magnet 30 energized, but when such speed is exceeded the circuit is broken by the movement of the brush 34 away from the strip 44, thereby deenergizing the magnet 30 and applying the brakes until the speed is reduced below the predetermined maximum under caution conditions. As a result, the vehicle cannot travel above the maximum caution speed under caution conditions.

When both switches 39 and 42 are open, then danger conditions exist in the vehicle equipment, and the caution contact strip 44 is removed from the circuit of the magnet 30, as well as the conductor 43. To provide speed control under danger conditions, a contact 45 is arranged to be engaged by the brush 34 when the vehicle is brought to a stop, and a danger contact strip 46 is arranged to be engaged by the brush 34 when the vehicle travels below a predetermined maximum speed under danger conditions, of for example from ten to fifteen miles per hour. A relay is provided for changing the control from the contact 45 to the contact strip 46 when the vehicle has been brought to a stop, and such relay includes the switch 47 and electro-magnet 48. A conductor 49 connects the contact 45 and magnet 48, and a normally open alert switch 50 is disposed between the magnet 48 and generator 31 and must be held closed by the engineer or operator when travelling under danger conditions. Thus, when the vehicle has come to a stop, by the deenergization of the magnet 30 when both switches 39 and 42 are open, and the switch 50 is held closed by hand, the magnet 48 will be energized, said magnet being normally deenergized to let the switch 47 drop away from the contact 51 connected to the contact strip 46. Accordingly, the magnet 30 will be energized, the circuit including the battery 31, conductor 35, magnet 30, conductor 36, brush 34, contact 45, conductor 49, magnet 48 and switch 50. The switch 47 is therefore raised against the contact 51 to establish the running circuit under danger conditions, such circuit including the battery 31, conductor 35, magnet 30, conductor 36, brush 34, contact strip 46, contact 51, switch 47, magnet 48 and switch 50. The switch 50 must be held closed by the engineer or operator while proceeding under danger conditions, so that he must be alert and ready to stop the vehicle or train in an emergency. Furthermore, if the maximum speed under danger conditions is exceeded, then the vehicle must again come to a stop before it can proceed, because if the brush 34 is lifted from the contact strip 46 by excessive speed under danger conditions, the circuit of the magnets 30 and 48 is broken between said brush and contact strip. This will let the switch 47 drop open away from the contact 51, thereby removing the contact strip 46 from the circuit as well as applying the brakes. The vehicle must then be brought to a stop to allow the brush 34 to engage the contact 45 before the vehicle can proceed, and a stop is therefore enforced whenever the danger speed restriction is not observed.

The switches 39 and 42 are held closed, when travelling between or beyond control stations, by means of stick relays including the electro-magnets 56 and 57 controlling the respective switches 59 and 58 which carry the insulated switches 39 and 42. The switches 59 and 58 are connected in series with the corresponding magnets 56 and 57 through the contacts 60 and 61, and the switch, contact and magnet of each stick relay is connected in a circuit 62 including windings or coils 63 of rail responsive elements. The two stick relays of the circuit 62 are connected in parallel, so that when either magnet is deenergized to let the corresponding switch drop open, the switch will remain open until raised by some other means (described hereinafter) inasmuch as the magnet will remain deenergized as long as the switch is open.

The rail responsive elements comprise transformers including the cores 64, primary windings or coils 65 thereon and also the secondary windings or coils 63. The primary windings 65 are connected in circuit with a generator 66, supplying alternating or pulsating current, to induce alternating or pulsating current in the windings 63 and circuit 62, the magnets 56 and 57 being alternating current magnets. The rail responsive elements move directly over the rails 11, and the cores 64 have their terminals offset downwardly so as to be disposed close adjacent to the rails. When the cores 64 move over iron or magnetic portions of the rails, the rails complete the magnetic circuits of the cores 64, with only small air gaps between the cores 64 and rails, so that maximum electrical energy is induced in the circuit 62, thereby energizing the magnets 56 and 57 sufficiently to hold the switches 58 and 59 closed, as well as the switches 39 and 42. The windings 63 are connected in parallel or multiple, so that when either core 64 is over an iron or magnetic portion of the corresponding rail, the circuit 62 receives sufficient energy to keep the magnets 56 and 57 energized. This will prevent said magnets from being deenergized unless both rail-responsive elements simultaneously pass over non-magnetic sections or portions of the rails. With this arrangement one rail-responsive element can pass over a non-magnetic switch point, frog, or rail section, and if the other rail-responsive element is over an iron or magnetic portion of rail. The magnets 56 and 57 will remain sufficiently energized to hold the corresponding switches closed. In mountainous sections it is the practice to use manganese steel rails at the outsides of curved portions of the track, and although the rail responsive element at one side will be interrupted in its inductive relation with the non-magnetic rail, the other rail-responsive element will have an inductive relation with the iron rail, so that the magnets 56 and 57 will remain energized. Also, the cores 64 can be offset longitudinally so that in passing over non-magnetic crossings, one of said cores will pass over an iron portion while the other passes over a non-magnetic portion.

When passing a control station, both cores 64 move over the non-magnetic rail sections 10 so that the magnetic circuits of both cores are broken between the terminals of the cores, thereby creating impedance or choking action in both transformers, and reducing the electrical energy induced in the circuit 62. As a result of the break of the inductive relation between the responsive elements and rails, due to the breaking of the magnetic circuits when passing over the non-magnetic rail sections, the magnets 56 and 57 are deenergized sufficiently to let the switches 58 and 59 drop, providing said switches are not held closed by other means. Accordingly, both switches 39 and 42 will drop open when passing the non-magnetic rail sections, to provide danger conditions, unless one or both of the switches 39 and 42 are held closed by other means while the rail responsive elements move over the non-magnetic rail sections. The action to release the switches 39 and 42 when passing a control station is positive and reliable owing to the break in the inductive relation between the rail responsive devices or elements and track when said devices or elements move over the non-magnetic rail sections, which is equivalent to the breaking of a normally closed circuit. In other words, it is necessary that the magnetic circuit of the cores 64 be completed by the iron or magnetic portions of the rails in order to keep the magnets 56 and 57 energized sufficiently to hold the switches 58 and 59 closed, and the moment either of said switches drops away from its contact it will remain open unless closed by some other means, as will hereinafter more fully appear. The stick relays controlled by the rail responsive elements will therefore open the switches 39 and 42 when the rail responsive elements pass the non-magnetic rail sections, providing the switches are not held closed by the other controlling means.

Receivers or responsive devices are carried by the vehicle, either in front or in rear of the rail responsive devices, so as to move over the rails 11 and conductors 12 when the rail responsive elements move over the non-magnetic rail sections 10. Said receivers or responsive devices comprise pick-up or detector coils $67^a$, $67^b$, $67'$ and $67''$. Said coils are arranged in two pairs and the pairs are rendered active and inactive alternately according to the direction of travel and according to which end of the vehicle is forward. Through suitable amplifying or relay connections, either pair of secondary responsive devices control electro-magnets 68 and 69 which control the switches 58 and 59 in addition to the magnets 57 and 56, respectively. As shown, radio audions or electrode valves 70 and 71 are employed between the responsive elements or coils $67^a$, $67^b$, $67'$ and $67''$ and the magnets 68 and 69. The electrical connections are similar to well known radio hook-ups. As shown, the audions 70 and 71 control the respective magnets 68 and 69, each audion having three electrodes, including the grids or input electrodes 72 and 73, respectively, the filaments or hot electrodes 74 and 75, respectively, supplied by the current from the batteries 76, and the plates or output electrodes 79 and 80, respectively. The plates 79 and 80 are connected by the respective conductors 77 and 78 with the magnets 68 and 69, and the filaments 74 and 75 are connected by the respective conductors 81 and 82 through the battery 31 with the magnets 68 and 69, so that each magnet is connected in circuit with the battery and corresponding audion, and the conductors 77 and 78 have suitable resistances 85 or other means therein to regulate the energization of the magnets 68 and 69. A conductor 90 is connected to the grid 72 and to the detector or pick-up coils $67^a$ and $67'$, and a conductor 91 is connected to the grid 73 and to the detector or pick-up coils $67^b$ and $67''$. Conductors 92 and 95 are connected to the filaments 74 and 75, respectively. Suitable tuning and adjusting means may be provided, such as condensers 86 and resistances 88 between the grids 72 and 73 and the respective conductors 92 and 91, and condensers 87 bridging the filaments and grids.

The audions 70 and 71 are connected through a reversing switch with the detector or pick-up coils, so that the audions are connected to one pair or the other of said coils according to the direction of movement of the vehicle. The reversing switch, which may be operated automatically by the reversing device of the locomotive or vehicle, includes a reversing lever or member 111, carrying the insulated switch plates 106, 107, 108 and 110 to bridge the corresponding pairs of contacts 94 and 102, 97 and 103, 93 and 104, and 96 and 105. The conductor 92 is connected to the contacts 93 and 94, and the conductor 95 is connected to the contacts 96 and 97. Conductors 98, 99, 100 and 101 connect the respective coils $67^a$, $67^b$, $67'$ and $67''$ with the corresponding contacts 102, 103, 104 and 105.

The circuits in which the audions are included are so tuned as to require alternating current of a predetermined frequency, such as supplied in the track circuits from the transformer 18, so that the vehicle equipment will not be effected by wayside signal current flowing in the rails, or by power current flowing in the rails in electrified railroads. The amplifying means between the pick-up or detector coils $67^a$, $67^b$, $67'$ and $67''$ and the corresponding magnets 68 and 69 may be of any suitable kind, and the arrangement illustrated represents only one arrangement of many that can be used.

As shown, the reversing lever 111 is swung so that the vehicle is moving toward the right, and the plate 106 bridges the contacts 94 and 102, while the plate 107 bridges the contacts 97 and 103. The coils $67^a$ and $67^b$ are therefore connected with the respective audions 70 and 71. Thus, one circuit includes the coil $67^a$, conductor 90, grid 72, filament 74, conductor 92, contact 94, switch plate 106, contact 102, and conductor 98. The other circuit includes the coil $67^b$, conductor 91, grid 73, filament 75, conductor 95, contact 97, switch plate 107, contact 103 and conductor 99. The coils $67'$ and $67''$ are cut out of the circuits, while the coils $67^a$ and $67^b$ are effective when passing over the near or lower rail 11 and conductor 12 located at the right side of the track considering the direction of travel toward the right as illustrated.

*Operation.*

*Danger conditions.*—When danger track or traffic conditions exist, both magnets 20 and 21 are deenergized, and the switches 16 and 17 open, so that no electrical energy flows in the rail 11 and conductor 12 at the control station. Whether the train or vehicle is travelling under clear, caution or danger conditions, a danger condition will then be established or maintained when passing the control station. Thus, the cores 64 passing over the non-magnetic rail sections 10 will result in the magnets 56 and 57 being deenergized, and the coils $67^a$ and $67^b$ receiving no energy from the track will result in the magnets 68 and 69 remaining deenergized, so that the switches 58 and 59 will drop or remain open, whichever is the case, and which also applies to the corresponding switches 42 and 39 carried by the switches 58 and 59. Consequently, the magnet 30 must be energized by way of the switch 50 and magnet 48 in order to proceed, and the vehicle must be brought to a stop to bring the brush 34 against the contact 45, and the switch 50 must be held closed by the engineer or operator before the magnet 48 is energized, unless the vehicle is already proceeding under danger conditions with the brush 34 engaging the contact strip 46. The magnet 48 being energized will raise the switch 47 and bring the contact strip 46 in the circuit, so that the vehicle can proceed at a slow rate of speed under danger conditions after the vehicle has first been brought to a stop and provided that the engineer maintains the alert switch 50 closed. If the speed is exceeded then the vehicle is again stopped before it can proceed, because the brush 34 being removed from the contact strip 46 will deenergize the magnet 48 as well as the magnet 30 until the vehicle is brought to a stop and the brush 34 is moved against the contach 45 to again reenergize the magnets 30 and 48.

*Clear conditions.*—When the track ahead is clear, both magnets 20 and 21 are energized and the switches 16 and 17 closed, so that electrical current from the transformer 18 flows in the rail 11 and conductor 12. Consequently, when the cores 64 move over the non-magnetic rail sections 10, to deenergize the magnets 56 and 57, with the coils $67^a$ and $67^b$ moving over the energized conductor 12 and energized portion of the rail 11, said coils will receive energy from the track, so that, through the amplifying or translating means, the magnets 68 and 69 are energized to hold the switches 58 and 59 closed during the interval that the magnets 56 and 57 are deenergized. Thus, the coil $67^a$ picking up energy from the conductor 12 will result in the flow of energy in the circuit of said coil including the conductor 90, grid 92, electron gap, filament 74, conductor 92, contact 94, switch plate 106, contact 102 and conductor 98. Also, energy picked up by the coil $67^b$ from the energized portion of the rail 11 will result in the flow of current in the circuit of said coil including the conductor 91, grid 73, filament 75, conductor 95, contact 97, switch plate 107, contact 103 and conductor 99. The flow of energy between the grids and filaments of the audions will result in the flow of current of greater strength from the battery 31 between the plates and filaments of the audions. The flow of current from the battery 31 through the coils of the magnets 68 and 69 is normally prevented by the gaps between the plates 79 and 80 and the filaments 74 and 75, respectively. However, when the input circuits of the audions are energized by current of required frequency, then the output circuits including the battery 31 and magnets 68 and 69 are energized with sufficient current to energize the magnets 68 and 69.

In this way, alternative holding magnets 68 and 69 for the stick relay switches 58 and 59 are energized while the magnets 56 and 57 are deenergized, but this requires the reception by the coils $67^a$ and $67^b$ of the required electrical energy from the track, and if the track energy fails or is unsuitable then the magnets 68 and 69 will not be energized to hold the switches 58 and 59 closed, and danger conditions will result. When the magnets 68 and 69 are energized, should the switches 58 and 59 be down, they will be raised so as to establish clear conditions if the train is proceeding under caution or danger conditions. When the switches 39 and 42 are closed the normal running or clear circuit is completed, including the battery 31, conductor 35, magnet 30, conductor 36, brush 34, conductor 37, contacts 38 and switch 39, conductor 40, contacts 41 and switch 42, and conductor 43. The vehicle can then proceed without speed restriction.

Before the coils $67^a$ and $67^b$ leave the energized conductor 12 and energized portion of the rail, with the magnets 68 and 69 still energized, the cores 64 move from the non-magnetic rail sections 10 over the iron or magnetic portions of the rails, so that the magnets 56 and 57 are again energized before the magnets 68 and 69 are deenergized. The conductor 12 and energized portion of the rail 11 extend beyond the rail sections 10 so that the coils $67^a$ and $67^b$ can receive energy whether they are in rear or in front of the rail responsive devices including the cores 64. This provides, under clear conditions, continuous inductive relation between the track and the vehicle equipment. Thus, when the rail-responsive devices are moving over iron or magnetic portions of the rails, the magnets 56 and 57 are energized, due to the inductive relation between the rail responsive elements and the rails, whereas when such inductive relation is broken by non-magnetic rail sections 10, then the coils $67^a$ and $67^b$ by inductive relation with the track must receive electrical energy from the track to energize the magnets 68 and 69 while the magnets 56 and 57 are deenergized. If both inductive relations between the responsive devices and track are interrupted then both holding magnets of each pair are deenergized to release the corresponding switches. For running conditions the inductive relation between the vehicle and track is continuous, but the control for clear, caution and danger conditions is intermittent, being effected at control stations depending on the flow of electrical current in the track circuits.

*Caution conditions.*—When caution conditions exist, the magnet 21 is energized and the magnet 20 is deenergized, with the switch 16 open and the switch 17 closed. Thus, no current flows in the rail 11, and current flows in the conductor 12 from the transformer 18. When the cores 64 move over the non-magnetic rail sections 10, the magnets 56 and 57 are deenergized the same as under clear and danger conditions. The coil 67$^a$ receives energy from the conductor 12 to energize the audion or valve 70 sufficiently so that current from the battery 31 will flow through the audion 70 and magnet 68 to energize said magnet sufficiently to hold the switch 58 closed, but the audion 71 does not receive energy from the coil 67$^b$ to enable the magnet 69 to be energized from the battery 84. Consequently, the switches 59 and 39 will drop open, while the switches 58 and 42 will remain closed, or, if the vehicle is proceeding under danger conditions, with the switches 58 and 59 open, the switch 59 remains open but the switch 58 is raised by the magnet 68. Therefore, when leaving the control station, the magnet 57 remains deenergized when the rail responsive elements move over the iron or magnetic portions of the rails, and the magnet 56 is energized, the magnet 68 also being deenergized when the coil 67$^a$ moves away from the conductor 12.

The caution running circuit is therefore completed, including the battery 31, conductor 35, magnet 30, conductor 36, brush 34, contact strip 44, conductor 40, contacts 41 and switch 42, and conductor 43. This requires that the vehicle must proceed below the predetermined maximum caution speed, inasmuch as the magnet 30 is deenergized and the brakes applied if the brush 34 is removed from the strip 44.

*Reversing arrangement.*

If the vehicle is turned around end for end, and travels in the same direction (toward the right in the drawing) the reversing switch 111 must be moved to its opposite position to travel in such direction. The coils 67$^a$ and 67$^b$ are therefore disconnected from the audions 70 and 71, and the coils 67' and 67'' will now be connected with said audions, the coils 67' and 67'' taking the place of the coils 67$^a$ and 67$^b$ to move over the lower or near rail 11 and conductor 12. The circuit of the coil 67' includes the conductor 90, grid 72, filament 74, conductor 92, contact 93, switch plate 108, contact 104, and conductor 100. The circuit of coil 67'' includes the conductor 91, grid 73, filament 75, conductor 95, contact 96, switch plate 110, contact 105 and conductor 101. The magnets 68 and 69 are therefore controlled in the same manner from the same conductor 12 and traffic rail 11 as when the coils 67$^a$ and 67$^b$ were effective as hereinbefore described.

Assuming with the parts positioned as shown in the drawing, the vehicle is reversed so as to travel backward, then the switch 111 being reversed will disconnect the coils 67$^a$ and 67$^b$ from the audions, and the coils 67' and 67'' will be connected with the audions 70 and 71, as just described hereinbefore. Now, the energy for the coils 67' and 67'' must be received from the conductor 12 and rail 11 at the upper or far side of the track, with the vehicle travelling toward the left.

Thus, with either end of the vehicle forward, and the vehicle travelling in either direction on the track, the rail 11 and conductor 12 at the right side of the vehicle with reference to the direction of travel are the ones that are effective, and the detector or pick-up coils at the right side of the vehicle are connected in the vehicle circuits to control the vehicle equipment. This takes care of travel in opposite directions on the same track, or the movement of the vehicle with either end forward.

If desired or necessary non-magnetic sections or portions of the rails between or beyond control stations can be rendered magnetic by attaching thereto iron bars or members, for the inductive cooperation of the rail-responsive devices including the cores 64, or, at such non-magnetic portions or sections, electrical current can be supplied on the track, the same as at control stations, to maintain the running condition of the vehicle equipment or to provide sub-stations.

The various circuits are on the normal closed circuit plan, so that failure of current, breaking of the circuits, short circuits, ground connections, and the like, will produce danger conditions, whereby failures are on the side of safety.

The arrangement is such that for either clear or caution conditions, energy must be received from a rail or conductor 12, when passing a control station, in order to avoid a danger condition. Thus, should the rail or conductor 12 be deenergized, even though the rail 11 is energized, the magnet 68 being deenergized when the magnets 56 and 57 are deenergized, will permit the switches 58 and 42 to open, so as to provide a danger condition in the vehicle equipment.

Having thus described the invention, what is claimed as new is:—

1. Vehicle controlling apparatus comprising a non-magnetic rail section in each rail of a vehicle track at each control station, two vehicle carried means having inductive relations with both rails and arranged to simultaneously pass the non-magnetic rail sections when passing a control station to completely break said inductive relations, and translating means affected when such complete break in inductive relations occurs.

2. Vehicle controlling apparatus comprising non-magnetic rail sections in both rails of a vehicle track at each control station, vehicle carried means having inductive relations with both rails and arranged to simultaneously pass over the non-magnetic rail sections of both rails when passing a control station to completely break said inductive relations, translating means affected when such complete break in the inductive relations occurs for obtaining a danger condition, and other means operable when the vehicle passes a control station to avoid said condition.

3. Vehicle controlling apparatus comprising a non-magnetic section in the vehicle track at each control station, vehicle carried responsive means having an inductive relation with the track for obtaining an interruption in said inductive relation whenever said means passes a non-magnetic section, vehicle carried means operable for obtaining one controlling condition when said interruption in inductive relation occurs, two trackside circuits having a source of current and means for opening and closing the circuits, and having parallel portions on the track, pick-up coils carried by the vehicle to pass said parallel portions of the trackside circuits to obtain energy therefrom, and means controlled by said coils for modifying the controlling condition according to energy received from the trackside circuits.

4. Vehicle controlling apparatus comprising a non-magnetic section in the vehicle track at each control station, vehicle carried responsive means having an inductive relation with the track for obtaining an interruption in said inductive relation whenever said means passes a non-magnetic section, two trackside circuits having parallel portions on the track, a source of electrical current and means for selectively opening and closing the circuits according to traffic conditions, said vehicle carried responsive means including elements for picking up energy from said parallel portions of the trackside circuits, and vehicle controlling means controlled by said responsive means for obtaining one controlling condition when said interruption in inductive relation occurs without the pick-up of energy by said elements, and for obtaining other controlling conditions selectively by the pick-up of energy by said elements from the trackside track circuits.

5. Vehicle controlling apparatus comprising a non-magnetic section in the vehicle track at each control station, means on the vehicle having an inductive relation with the track for obtaining an interruption in said inductive relation whenever said means passes a non-magnetic section, vehicle carried controlling means for obtaining one controlling condition when said interruption in inductive relation occurs, two trackside circuits including parallel portions on the track, a source of electrical current and means for selectively opening and closing the circuits according to traffic conditions, vehicle-carried pick-up coils to move over said parallel portions for picking up energy therefrom, and electrical means controlled by said coils and controlling said controlling means for obtaining other controlling conditions selectively according to the pick-up of energy by said coils from the trackside circuits.

6. Vehicle controlling apparatus comprising a non-magnetic section in the vehicle track at each control station, two trackside circuits having a source of electrical current and means for opening and closing the circuits, one circuit including a portion of one rail and the other circuit including a conductor on the track parallel with said rail, vehicle carried responsive means having an inductive relation with the track for obtaining an interruption in said inductive relation whenever said means passes a non-magnetic section, and also having an inductive relation with said rail and conductor for picking up energy therefrom, and vehicle controlling means controlled by said responsive means and operable for obtaining one vehicle condition when said interruption in inductive relation occurs without the pick-up of energy from the trackside circuits, and for obtaining other vehicle conditions selectively when said responsive means picks up energy from the trackside circuits.

7. Vehicle controlling apparatus comprising a non-magnetic section in the vehicle track at each control station, two trackside circuits including a source of electrical current and means for opening and closing the circuits, one circuit including a portion of one rail and the other circuit including a conductor on the track parallel with said rail, means on the vehicle having an inductive relation with the track for obtaining an interruption in said inductive relation whenever said means passes a non-magnetic section, pick-up coils carried by the vehicle to pass said rail and conductor for picking up energy therefrom, and vehicle controlling means controlled by said inductive means and coils for obtaining a danger vehicle controlling condition when said interruption in inductive relation occurs without the pick-up of energy by said coils, and for obtaining clear and caution vehicle controlling conditions selectively according to the pick-up of energy by said coils from the trackside circuits.

8. Vehicle controlling apparatus comprising vehicle carried responsive means normally in inductive relation with the track when travelling between control locations, trackside means for interrupting said inductive relation at control locations, a plurality of trackside circuits at each control location and having sources of energy and controlling means, and vehicle carried pick-up coils inductively cooperable with the trackside circuits when passing control locations, and vehicle controlling means controlled by said coils and responsive means.

9. Vehicle controlling apparatus comprising a non-magnetic section in the vehicle track at each control location, vehicle carried responsive means having an inductive relation with the track for obtaining an interruption in said inductive relation whenever said means passes a non-magnetic section, two trackside circuits at each control location of the track having sources of energy and means for controlling the circuits, pick-up coils carried by the vehicle to cooperate inductively with said circuits when passing the control locations, and vehicle controlling means controlled by said responsive means and coils.

10. Vehicle controlling apparatus comprising vehicle carried controlling means, means controlling said means and normally in inductive relation with the track when travelling between control locations and affected to obtain danger conditions when passing control locations, a plurality of trackside circuits at each control location of the track and having sources of energy and controlling means, and pick-up coils carried by the vehicle to cooperate inductively with said trackside circuits and controlling said controlling means to obtain clear and caution conditions selectively.

In testimony whereof I hereunto affix my signature.

ALFRED L. RUTHVEN.